United States Patent
Nakajima

[19]

[11] Patent Number: 5,983,715
[45] Date of Patent: Nov. 16, 1999

[54] INITIAL CORRECTING APPARATUS FOR AUTOMATICALLY PERFORMING AN INITIAL CORRECTION PROCESSING IN A TIRE AIR PRESSURE REDUCTION DETECTING APPARATUS

[75] Inventor: Yoshio Nakajima, Itami, Japan

[73] Assignees: Sumitomo Electric Industries, Ltd., Osaka; Sumitomo Rubber Industries, Ltd., Hyogo, both of Japan

[21] Appl. No.: 09/048,225

[22] Filed: Mar. 26, 1998

[30] Foreign Application Priority Data

Apr. 14, 1997 [JP] Japan .................................. 9-095743

[51] Int. Cl.$^6$ .................................................. B60C 23/02
[52] U.S. Cl. ........................................ 73/146.2; 340/444
[58] Field of Search ............................. 73/146.2; 340/444

[56] References Cited

U.S. PATENT DOCUMENTS 5,606,122  2/1997  Taguchi et al. ...................... 73/146.2
5,724,266  3/1998  Kishimoto et al. ................ 73/146.2 X

FOREIGN PATENT DOCUMENTS

| 63-305011 | 12/1988 | Japan . |
| 6-92114 | 4/1994 | Japan . |
| 6-183227 | 7/1994 | Japan . |
| 7-156621 | 6/1995 | Japan . |
| 7-186644 | 7/1995 | Japan . |
| 8-164720 | 6/1996 | Japan . |

*Primary Examiner*—Joseph L. Felber
*Attorney, Agent, or Firm*—Rabin & Champagne, PC

[57] ABSTRACT

According to the present invention, an initial correction is executed on the dynamic load radii of the tires automatically, for example, at the time when the power supply of the computer for executing a tire air pressure reduction detection processing is turned on for the first time after the tire air pressure reduction detecting apparatus has been produced. It is therefore not required to press the initialization switch for making an initial correction. This results in a reduction in the number of inspection steps.

11 Claims, 8 Drawing Sheets

INITIAL CORRECTING APPARATUS FOR AUTOMATICALLY PERFORMING AN INITIAL CORRECTION PROCESSING IN A TIRE AIR PRESSURE REDUCTION DETECTING APPARATUS

FIELD OF THE INVENTION

The present invention relates to an apparatus which is used for detecting a reduction in tire air pressure of a motor vehicle having four wheels. The apparatus is adapted to execute an initial correction processing based on the dynamic load radii of the tires.

DESCRIPTION OF THE RELATED ART

As a safety means for motor vehicles having four wheels, such as passenger cars, trucks or the like, there has been developed an apparatus for detecting a reduction in a tire's air pressure.

In the tire air pressure reduction detecting apparatus, the angular velocities of the tires are detected and, based on the detected angular velocities, a tire having a relatively reduced air pressure is detected (For example, Japanese Patent Laid-Open Publication No. 63-305011).

The tire air pressure reduction detecting apparatus has conventionally been arranged such that the respective angular velocities of the four tires are obtained using wheel rotational velocity sensors for detecting the rotational states of the four tires, respectively. The average value of the angular velocities of one pair of diagonally disposed tires is subtracted from the average value of the angular velocities of another pair of diagonally disposed tires. When the difference thus obtained is, for example, not less than 0.05% of the average value of the angular velocities of the four tires, it is judged that there is a tire that has reduced air pressure.

Even though the tires of a four-wheeled vehicle have a normal inner air pressure, the dynamic load radii of the tires may not always be equal to one another (each dynamic load radius is defined as a value obtained by dividing, by $2\pi$, the distance that each rolling tire has traveled with a load applied during one revolution). This is because, at the time of production, tires always include variations in their dynamic load radius (hereinafter referred to as initial differences) within the standards. It is known that such variations are about 0.1% in terms of standard deviation. On the other hand, when a tire is reduced in air pressure by 0.6 kg/cm 2 (which corresponds to a reduction an inner pressure of 30% when the normal inner air pressure is equal to 2.0 kg/cm2), a change in the dynamic load radius is about 0.2%. More specifically, the variations in the dynamic load radius due to the initial differences are approximately equivalent to the variations in the dynamic load radius due to a reduction in air pressure. Accordingly, the above-mentioned judging method alone cannot accurately detect a reduction in air pressure, due to possible variations in the dynamic load radius of the respective tires.

To solve this problem, it is required to execute, before executing an air pressure reduction detection processing, a processing for correcting the initial differences of the tires (hereinafter referred to as initial correction processing). The initial correction processing is executed in the following manner. For example, when all the tires have a normal inner air pressure, a tire is first selected as a reference tire. Correction coefficients based on the angular velocity of the reference tire are then obtained for the other three tires. These correction coefficients thus obtained are respectively multiplied by the angular velocities of the other three tires (Japanese Patent Laid-Open Publications No. 7-156621 and No. 6-183227).

Such initial correction processing is generally executed before delivery of a motor vehicle from the factory or immediately after replacement of a tire. It is therefore required for a factory inspector to press a predetermined initialization switch.

However, the manipulation of such an initialization switch is troublesome, and the factory inspector or service personnel may forget to press the initialization switch. For the factory, pressing the initialization switch results in one additional production step.

DISCLOSURE OF THE INVENTION

It is an object of the present invention to provide an initial correcting apparatus capable of automatically executing an initial correction processing.

The initial correcting apparatus of the present invention is characterized in that an initial correction processing automatically starts (i) at the time when the power supply of the computer for executing a tire air pressure reduction detection processing is turned on for the first time after the tire air pressure reduction detecting apparatus has been produced, (ii) at the time when a motor vehicle has traveled a predetermined distance after a point of time the power supply of the computer for executing a tire air pressure reduction detection processing was turned on for the first time after the tire air pressure reduction detecting apparatus had been produced, (iii) at the time when a predetermined period of time has passed from the point of time the power supply of the computer for executing a tire air pressure reduction detection processing was turned on for the first time after the tire air pressure reduction detecting apparatus had been produced or (iv) at the time when the power supply of the computer for executing a tire air pressure reduction detection processing has been turned on a predetermined number of times from the point of time the power supply was turned on for the first time after the tire air pressure reduction detecting apparatus had been produced.

According to one embodiment, at the time when the computer power supply is turned on for the first time, an initial correction processing can automatically be executed with no initialization switch being pressed. It is therefore not required to press an initialization switch for making the initial correction. This results in a reduction in the number of production steps.

However, there are instances where, at the time the computer power supply is turned on for the first time, tests are conducted on a motor vehicle arranged to travel on the drums of a drum testing machine in a motor vehicle assembling line. No trouble is caused when the drums include substantially no error in diameter. However, a front drum may be subtly different from a rear drum in diameter, and/or a left drum may be subtly different from a right drum in diameter. When there is a difference of 0.2% between the largest angular velocity and the smallest angular velocity out of the angular velocities detected by a tire air pressure reduction detection processing, this indicates a difference in diameter of 2 mm for drums having a nominal diameter of 1 m. Since the drums of a drum testing machine are not produced with a high degree of precision, such a difference is probably to be expected. Accordingly, when an initial correction processing is executed on a motor vehicle on a drum testing machine, this involves a likelihood that the initial correction coefficients include errors due to the influence of differences in diameter of the drums, thereby resulting in an erroneous generation of an alarm when the motor vehicle actually travels on a road. In this connection, when tests are to be conducted on a motor vehicle on the drums of a drum testing machine in a vehicle assembling line at the time the computer power supply is turned on for the first time, it is meaningful to make provision such that an initial correction processing will be executed at the time stated in each of the following embodiments.

According to the second embodiment, an initial correction processing is to be made at a point of time later than the point of time according to the first aforementioned embodiment. When tests are to be conducted on a motor vehicle on the drums of a drum testing machine in a motor vehicle assembling line, the tests can be completed without executing an initial correction processing. The arrangement according to the second embodiment is effective when the maximum traveling distance in the vehicle assembling line can be determined.

The arrangement according to the third embodiment is effective when the maximum period of time can be determined, during which the computer power supply is turned on in the vehicle assembling line.

The arrangement according to the fourth embodiment is effective when the maximum number of power-turning-on times in the vehicle assembling line can be determined.

DETAILED DESCRIPTION OF THE INVENTION

Referring to the attached drawings, the following description will discuss in detail embodiments of the present invention. The description will discuss first a tire air pressure reduction detecting apparatus, and then an initial correction processing according to the present invention.

A. Arrangement of the Tire Air Pressure Reduction Detecting Apparatus

Figure 1:
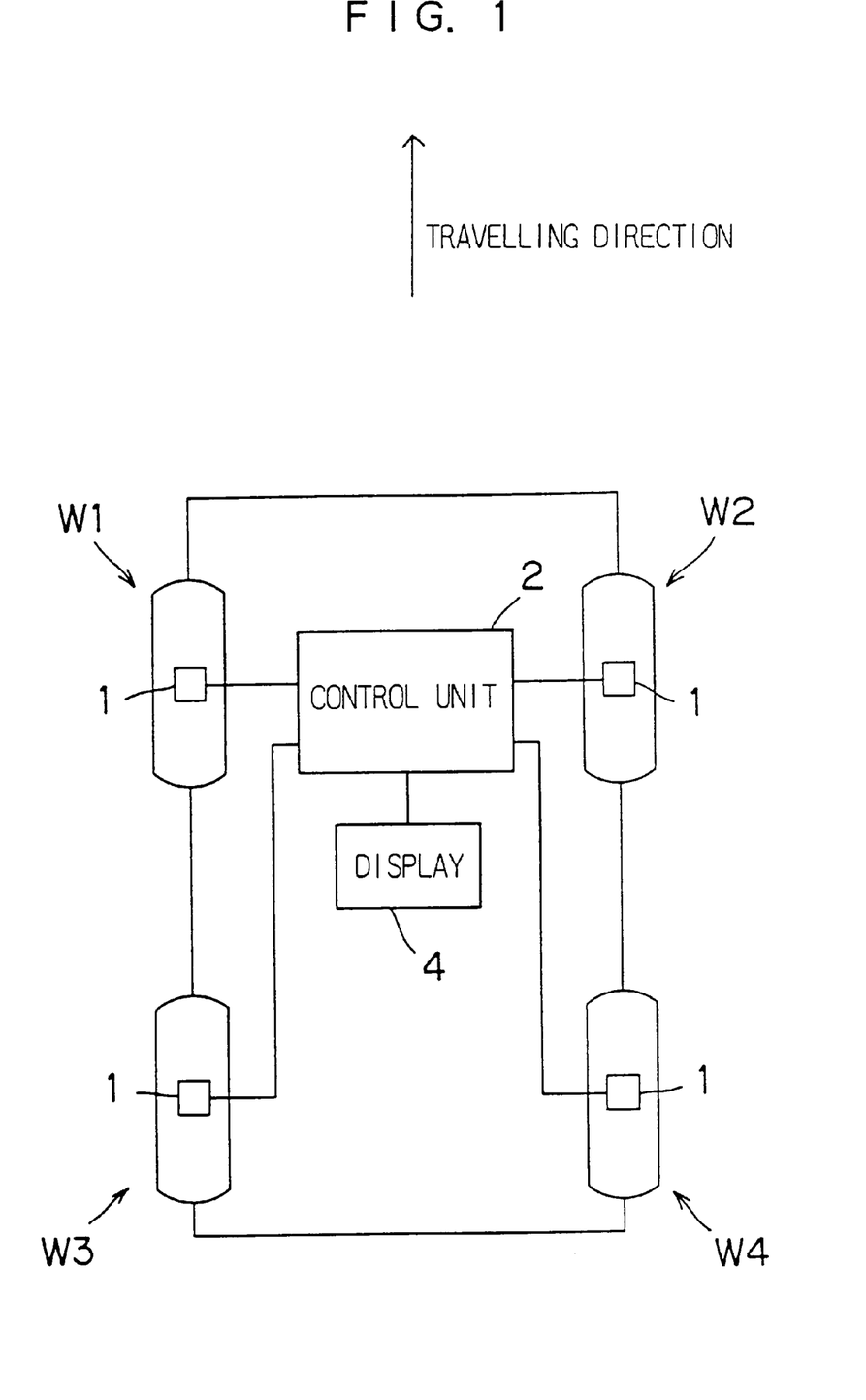
FIG. 1 is a block diagram of an installation example of a tire air pressure reduction detecting apparatus.

FIG. 1 is a block diagram of an installation example of a tire air pressure reduction detecting apparatus. The tire air pressure reduction detecting apparatus has wheel rotational velocity sensors 1, each having an arrangement known per se, respectively disposed in association with the tires $W_1$, $W_2$, $W_3$, $W_4$ of a four-wheeled motor vehicle. The outputs of the wheel rotational velocity sensors 1 are supplied to a control unit 2, to which is connected a display (CRT or the like) 4 for displaying a tire reduced in air pressure.

Figure 2:
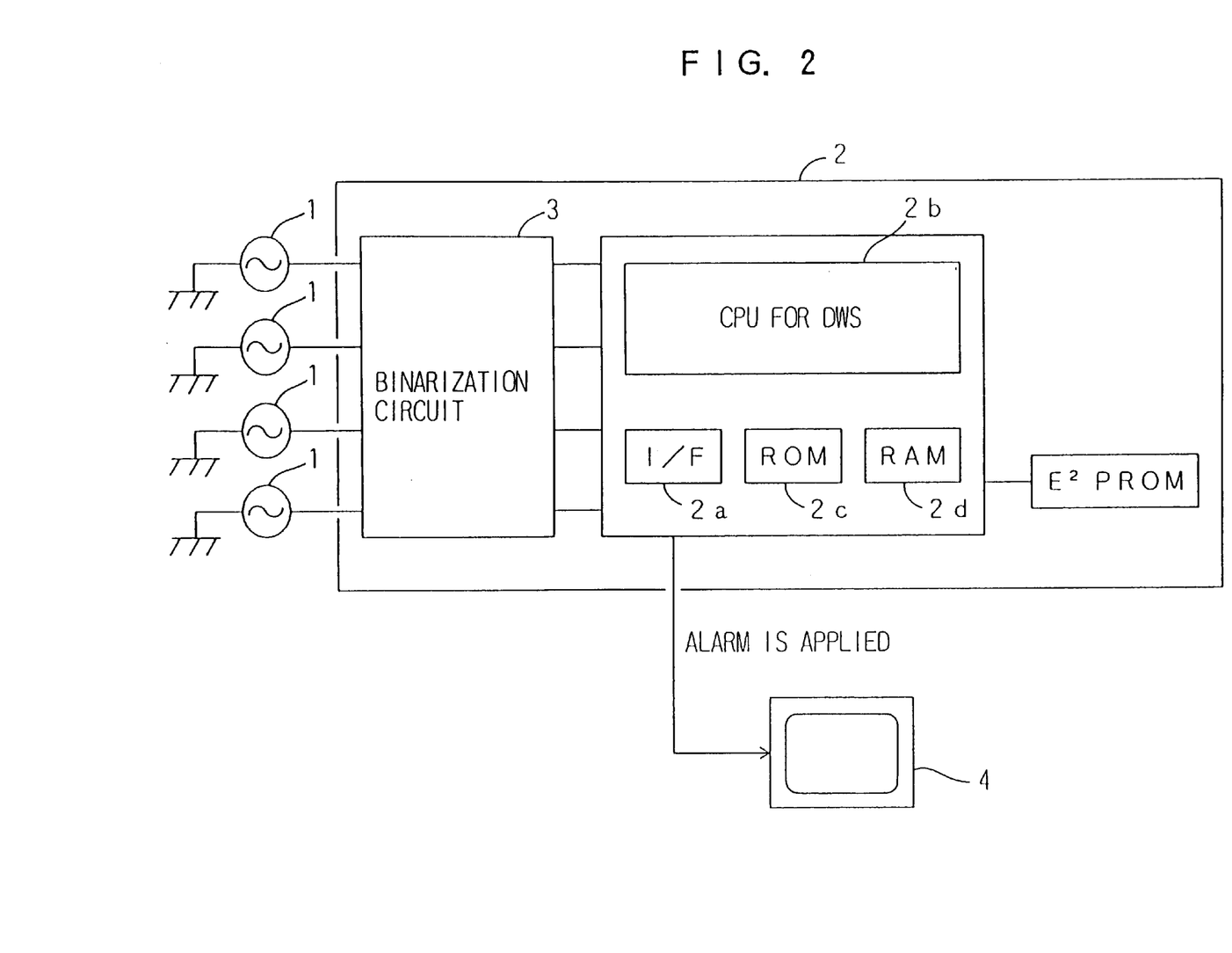
FIG. 2 is a block diagram illustrating an electric arrangement of the tire air pressure reduction detecting apparatus.

FIG. 2 is a block diagram illustrating an electric arrangement of the tire air pressure reduction detecting apparatus. The control unit 2 is formed of a microcomputer and comprises, as hardware, an I/O interface 2a for receiving and supplying a signal from and to an external device, a CPU 2b for a deflation warning system (DWS), and which serves as a center of operational processing, a ROM 2c containing a control operation program of the CPU 2b, a RAM 2d in which a data or the like is temporarily written when the CPU 2b executes a control operation and from which a written data is read out when the CPU 2b executes a control operation, and a nonvolatile memory $E^2$ PROM containing coefficients to be used in an initial correction processing which is to be discussed later.

B. Initial Correction Processing

Even though the tires $W_1$ to $W_4$ of a motor vehicle have a normal inner pressure, the dynamic load radii of the tires are not always equal to one another due to variations (initial differences), within the standards, inevitably generated at the time of production of the tires. This, if not corrected, will result in initial differences in angular velocities of the tires. To correct such initial differences of angular velocities of the tires, an initial correction processing is to be executed.

Using a flow chart (FIG. 3), the following description will discuss an initial correction processing.

Figure 3:
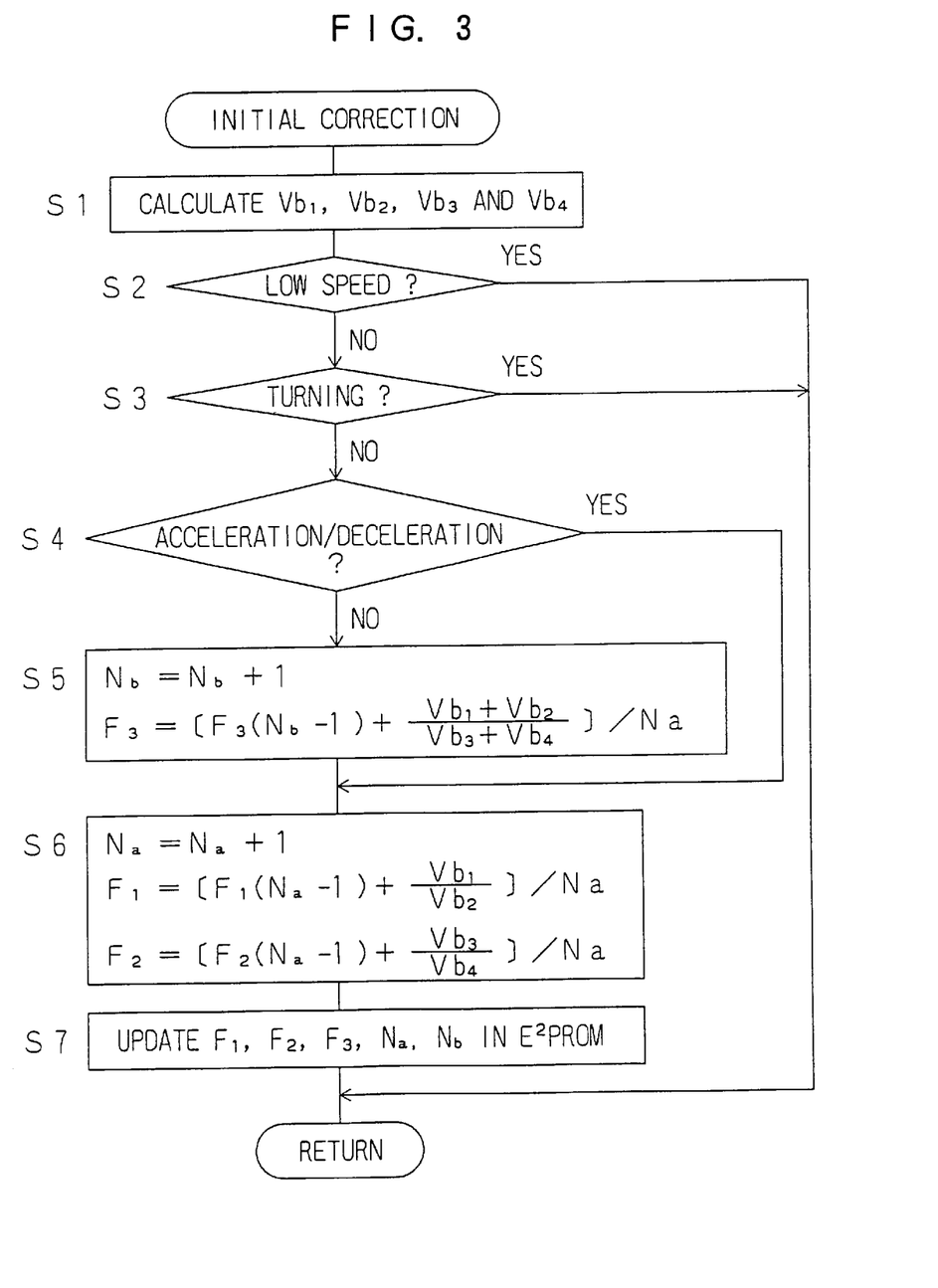
FIG. 3 is a flow chart illustrating an initial correction processing.

Each wheel rotational velocity sensor 1 supplies a signal corresponding to the number of rotations of each tire $W_i$ (in which i corresponds to 1, 2, 3, 4 of the tires $W_1$, $W_2$, $W_3$, $W_4$. This is also applied in the following). More specifically, each wheel rotational velocity sensor 1 supplies a sine-wave signal according to a change in magnetic field generated by the rotation of a sensor rotor which has a plurality of teeth and which is disposed inside of the wheel of each tire $W_i$. This sine-wave signal is converted into a pulse signal (hereinafter referred to as wheel rotational velocity pulse) in a binarization circuit 3 (See FIG. 2). Based on each wheel rotational velocity pulse, the CPU 2b calculates the rotational angular velocity $Vb_i$ of each tire $W_i$. More specifically, each angular velocity $Vb_i$ is calculated according to the following equation (step S1):

$$Vb_i = KN_i/T_i$$

wherein $N_i$ is the number of pulses between the last pulse in the previous cycle of measurement and the last pulse in the current cycle of measurement, Ti is the period of time between the last pulse in the previous cycle of measurement and the last pulse in the current cycle of measurement, and K is the coefficient corresponding to the rotational angle of each wheel per pulse.

The CPU 2b judges whether or not the motor vehicle is traveling at a low speed (step S2). In the affirmative, each angular velocity $Vb_i$ is not calculated. This is because the number of entered pulses is small when the motor vehicle is traveling at low speed thereby increasing the quantization error.

Then, the CPU 2b judges whether or not the motor vehicle is turning (step S3). A judgment of whether or not the motor vehicle is turning is made by obtaining a turning radius based on the angular velocities of a pair of left and right tires. The method of obtaining such a turning radius is known, for example, according to Japanese Patent Laid-Open Publication No. 8-164720.

When it has been judged that the motor vehicle is not turning, it is then judged whether or not the motor vehicle is under acceleration/deceleration (step S4). When it has been judged that the motor vehicle is not under acceleration/deceleration, there are then obtained a ratio $F_1$ in angular velocity between front left and right wheels, and a ratio $F_2$ in angular velocity between rear left and right wheels as follows:

$$F_1 = Vb_1/Vb_2$$

$$F_2 = Vb_3/Vb_4$$

Then, there is obtained a front-to-rear wheel ratio $F_3$ as follows:

$$F_3 = (\text{average of } Vb_1 \text{ and } Vb_2)/(\text{average of } Vb_3 \text{ and } Vb_4)$$

Then, an initial correction processing is executed according to the following equations:

$$V_1 = Vb_1$$

$$V_2 = Vb_2 \, F_1$$

$$V_3 = Vb_3 \, F_3$$

$$V_4 = Vb_4 \, F_3 \, F_2$$

$V_i$ is the angular velocity of each tire $W_i$ after initial correction.

When it has been judged that the motor vehicle is under acceleration/deceleration, only the front left- and right-wheel ratio $F_1$ and the rear left- and right-wheel ratio $F_2$ are obtained, but not the front-to-rear wheel ratio $F_3$. The ratio $F_3$ is to be obtained only when the motor vehicle is under neutral traveling (without acceleration/deceleration). This is because a front or rear wheel may slip while the motor vehicle is traveling in an acceleration/deceleration state.

A high precision is required for an initial correction processing. Accordingly, momentary angular velocity ratios $F_1$, $F_2$, $F_3$ are not used, but it is preferable to moderately update angular velocity ratios with the use of average values of current angular velocities and past angular velocities, such average values being calculated at regular updating intervals. When the number of updating times of each of $F_1$ and $F_2$ is defined as $N_a$, and the number of updating times of $F_3$ is defined as $N_b$, the ratios $F_1$, $F_2$ and $F_3$ to be used for updating are actually obtained according to the following equations (step S5 and step S6). Here, two numbers of updating times $N_a$, $N_b$ are available. This is because the ratio $F_3$ is to be obtained only when the motor vehicle is under neutral traveling (without acceleration/deceleration).

$$F_1 = [\text{past } F_1 \, (N_a-1) + \text{current } F_1]/N_a$$

$$F_2 = [\text{past } F_2 \, (N_a-1) + \text{current } F_2]/N_a$$

$$F_3 = [\text{past } F_3 \, (N_b-1) + \text{current } F_3]/N_b$$

Each data $F_1$, $F_2$, $F_3$, $N_a$, $N_b$ are stored in the nonvolatile memory $E^2$ PROM every time the data are updated (step S7) so that, even though the power supply is turned off in the course of calculation, the calculation can be continued when the power supply is then turned on.

C. Air Pressure Reduction Judgment Processing

Figure 4:
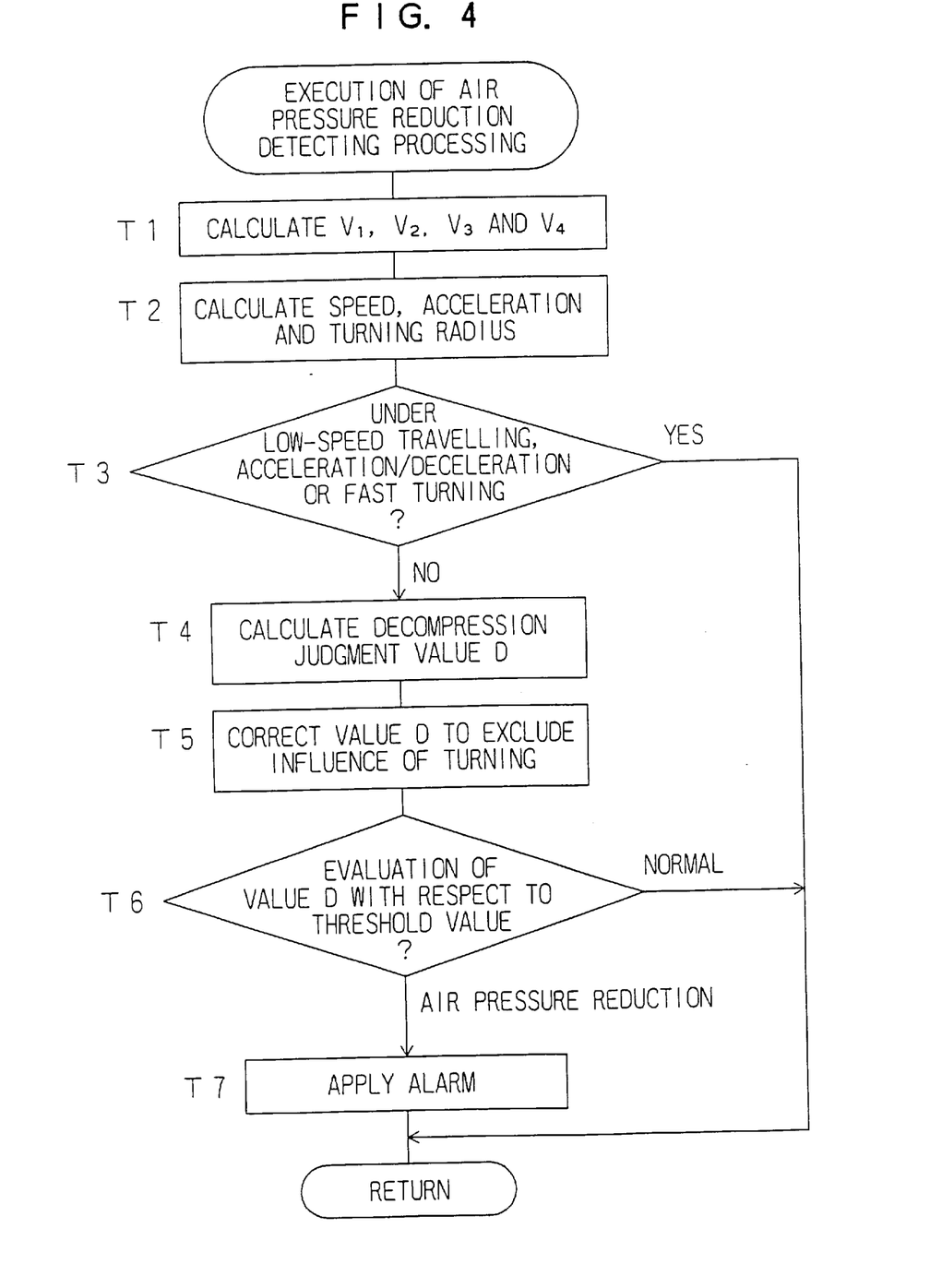
FIG. 4 is a flow chart illustrating an air pressure reduction judgment processing.

Using the flow chart in FIG. 4, the following description will discuss briefly an air pressure reduction judgment processing.

First, each angular velocity after initial correction $V_i$ is obtained (step T1), and then the speed, acceleration and turning radius of the motor vehicle (step T2) are calculated. The acceleration may be obtained from an accelerometer attached to the motor vehicle or based on the angular velocity of a tire (The obtaining method is known, for example, by Japanese Patent Laid-Open Publication No. 6-92114).

Then, it is judged whether the motor vehicle is under low-speed traveling, acceleration/deceleration or fast turning conditions (step T3). When it has been judged that the motor vehicle is neither under a low-speed traveling condition, nor under acceleration/deceleration condition nor under a fast turning condition, a decompression judgment value D is obtained according to the following equation (step T4: See Japanese Patent Laid-Open Publication No. 63-305011).

$$D = \{(V_1+V_4)-(V_2+V_3)\}/2(V_1+V_2+V_3+V_4)$$

When it has been judged that the motor vehicle is under a slow turning condition, the decompression judgment value D is then corrected to exclude the influence of turning from tire air pressure reduction detection (step T5: Japanese Patent Laid-Open Publication No. 8-164720). Then, the relationship between the decompression judgment value D and a predetermined threshold value is evaluated (step T6). When the judgment value D exceeds the threshold value, a predetermined display is made on the display 4 and an alarm is supplied (step T7). An air pressure reduction judgment processing is executed per measurement cycle. To stabilize the judgment, however, provision may be made such that an alarm is supplied only when a decision that the judgment value D exceeds the threshold value is continuously made a predetermined number of times (Japanese Patent Laid-Open Publication No. 7-186644).

D. Timing of Initial Correction Processing (1) When an initial correction is made at the time the power supply of the CPU 2b is turned on for the first time after the tire air pressure reduction detecting apparatus has been produced:

In a DWS-ECU (electronic control unit of DWS) production line, writing and reading tests are conducted on the $E_2$ PROM to make sure that the ECU is normal. After the writing and reading tests, $F_1=F_2=F_3=1$ and $N_a=N_b=0$ are written as the tire initial correction data in the $E^2$ PROM before completion of the tests. Then, a tire initial correction processing can automatically be executed from the beginning when the power supply of the CPU 2b is turned on for the first time after the DWS-ECU has been delivered from the ECU production factory.

Figure 5:
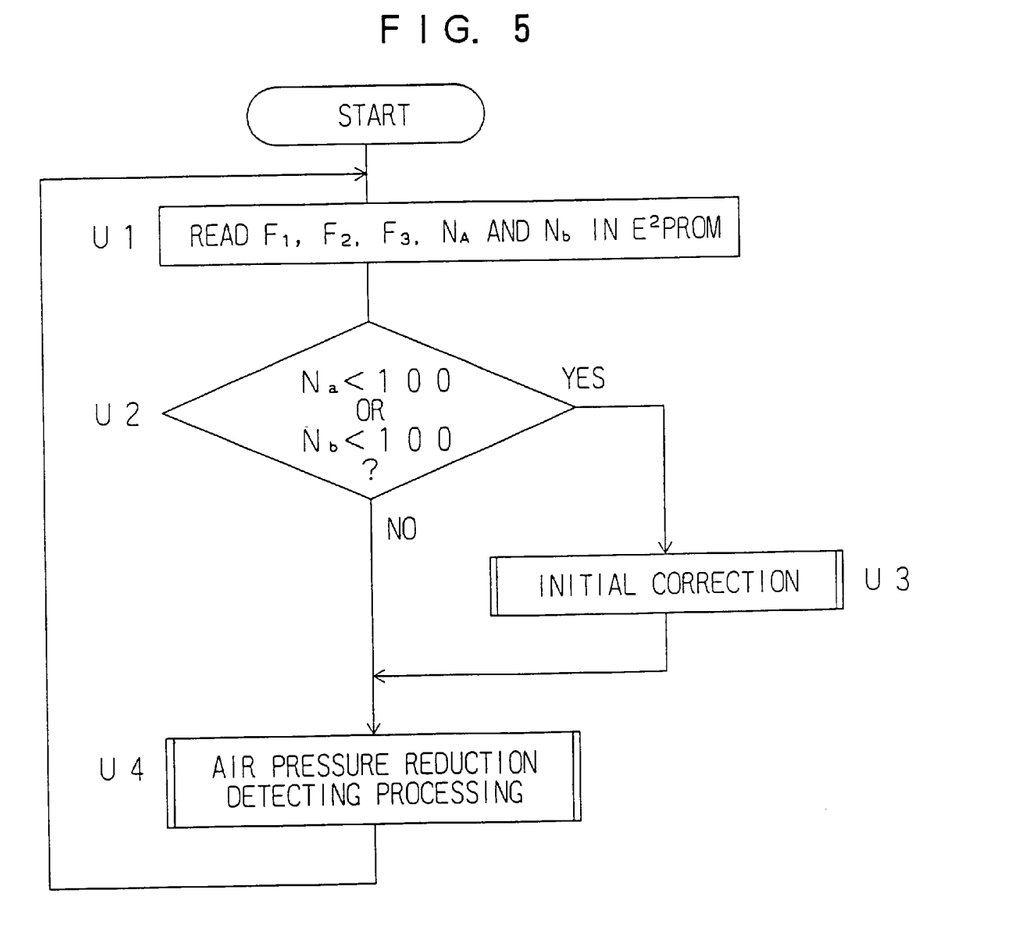
FIG. 5 is a flow chart illustrating the timing of an initial correction processing when the initial correction is to be made when the power supply is turned on for the first time after the tire air pressure reduction detecting apparatus has been produced.

The foregoing is shown in a flow chart in FIG. 5. According to the flow chart, an initial correction processing starts when the values of $N_a$ and $N_b$ are smaller than a predetermined value (for example, 100), and the initial correction processing is finished when the values of $N_a$ and $N_b$ reach a predetermined value.

(2) When an initial correction is made at the time when the motor vehicle has traveled a predetermined distance after the point of time the power supply of the CPU 2b was turned on for the first time after the tire air pressure reduction detecting apparatus had been produced:

After it has been made sure in a DWS-ECU production line that the ECU is normal, $F_1=F_2=F_3=1$, $N_a=N_b=0$ and counter DIST=0 are written as the tire initial correction data in the $E^2$ PROM before completion of the tests.

Figure 6:
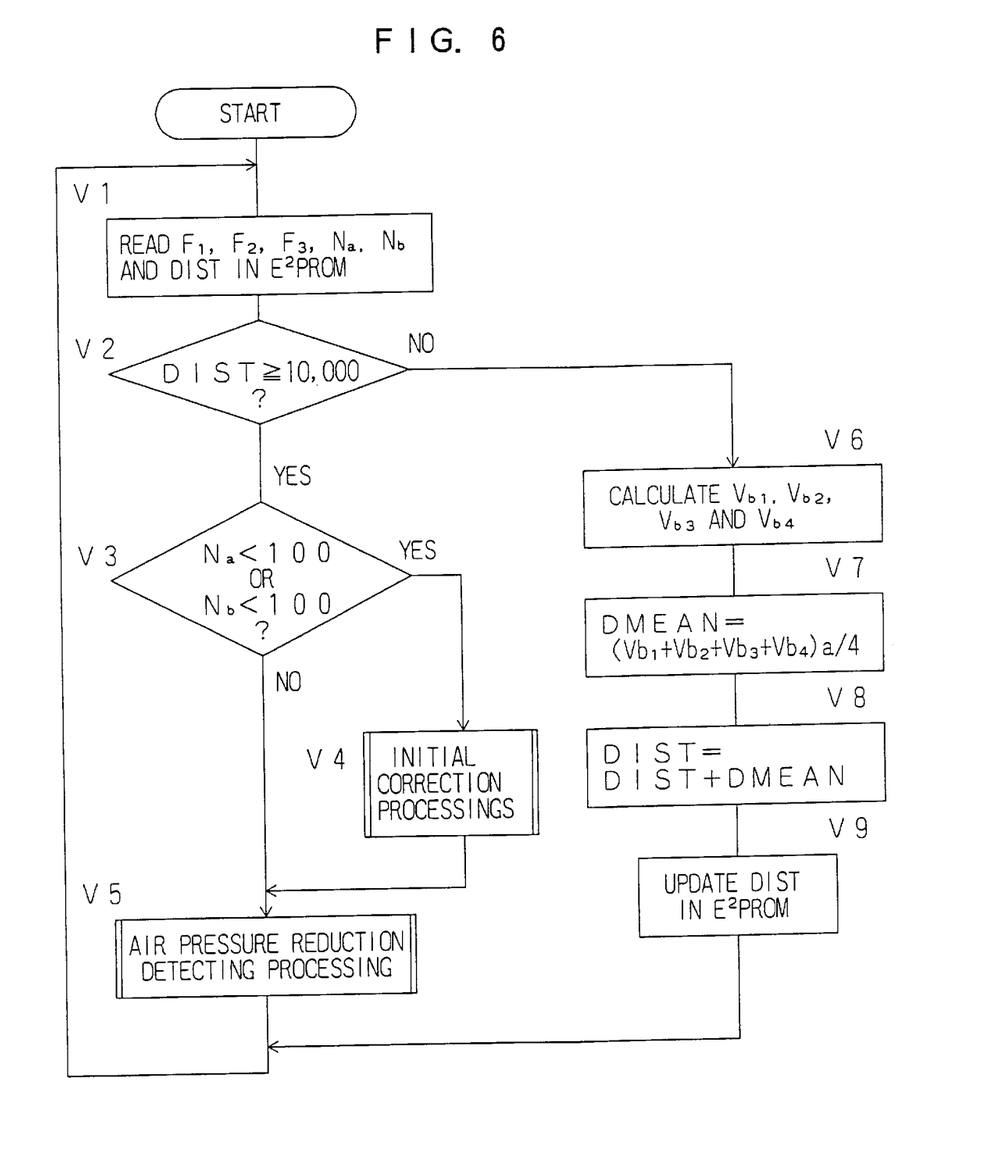
FIG. 6 is a flow chart illustrating the timing of an initial correction processing when the initial correction is to be made when the motor vehicle has traveled a predetermined distance from the point of time the power supply was turned on for the first time after the tire air pressure reduction detecting apparatus had been produced.

Then, as shown in the flow chart in FIG. 6, the data are read after the power supply of CPU 2b has been turned on for the first time (step V1), and there is added, to the DIST, a value DMEAN obtained by multiplying the average angular velocity of the four wheels by the dynamic load radius of a tire, to thereby update the DIST (step V6 to step V9). When the DIST reaches a predetermined value (corresponding to, for example, 10000 m or 10 km), a tire initial correction processing starts (step V2 to step V4). After the DIST reaches the predetermined value, no counter operation is made. Provision may be made such that a predetermined value is set as the initial value and that a subtraction is made until the initial value becomes zero. No air pressure reduction judgment processing is made before the initial correction processing is finished.

(3) When an initial correction is made at the time when a predetermined period of time has passed from the point of time the power supply of the CPU 2b was turned on for the first time after the tire air pressure reduction detecting apparatus had been produced:

After it has been made sure in a DWS-ECU production line that the ECU is normal, $F_1=F_2=F_3=1$, $N_a=N_b=0$ and counter TT=TCNT=0 are written as the tire initial correction data in the $E^2$ PROM before completion of the tests.

Figure 7:
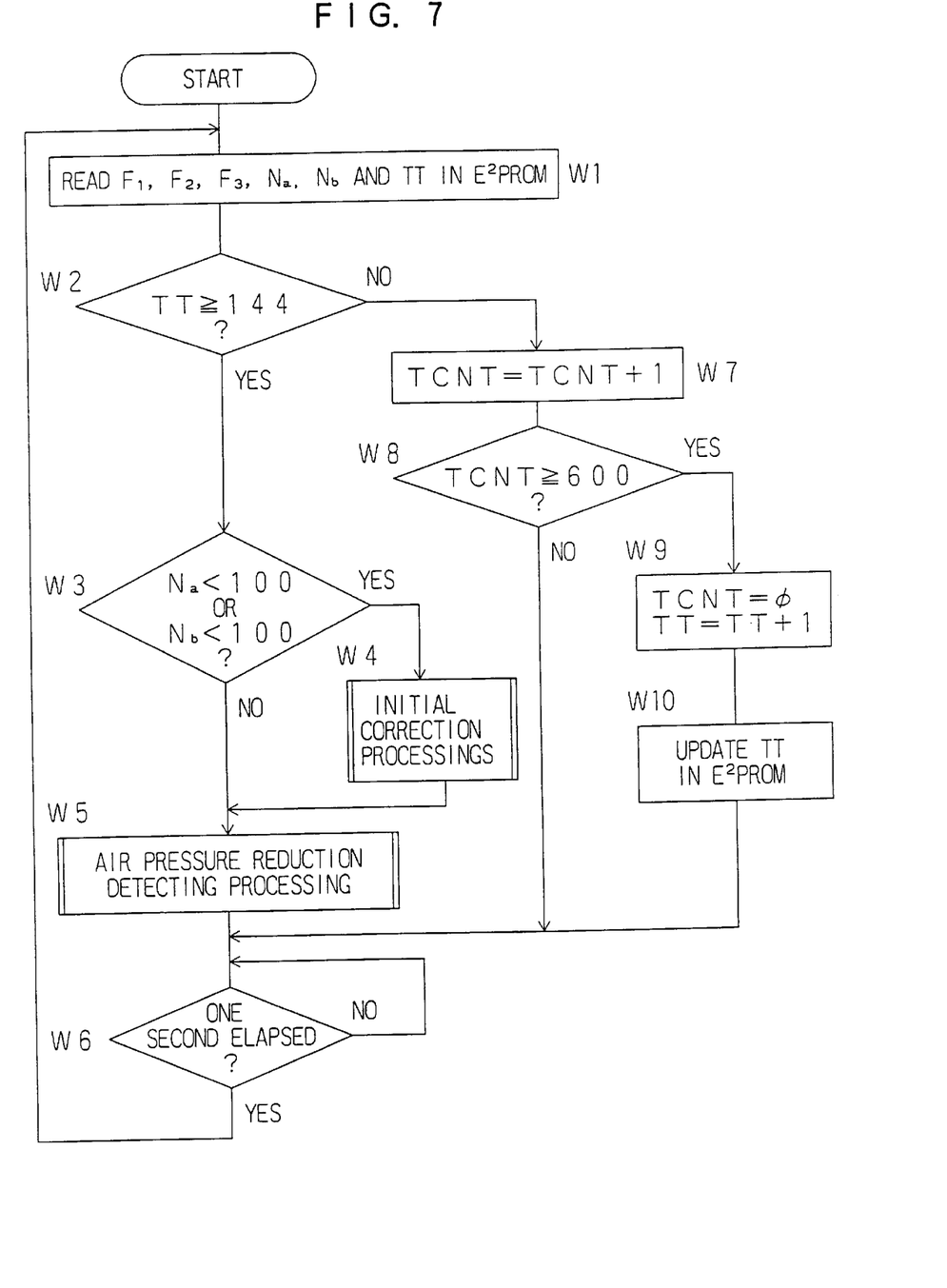
FIG. 7 is a flow chart illustrating the timing of an initial correction processing when the initial correction is to be made when a predetermined period of time has passed from the point of time the power supply was turned on for the first time after the tire air pressure reduction detecting apparatus had been produced.

Then, as shown in the flow chart in FIG. 7, the data are read after the power supply of CPU 2b has been turned on for the first time (step W1). The TCNT is counted up per second, and each time the TCNT reaches 600 (corresponding to 10 minutes), the TT is counted up (step W6 to step W10). When the TT reaches a predetermined value (for example, TT=144 corresponding to 24 hours), a tire initial correction processing starts (step W2 to step W4). No counter operation is made after the TT has reached the predetermined value. Provision may be made such that 144 is set as the initial value of TT and that a subtraction is made until the initial value becomes zero. No air pressure reduction judgment processing is made before the initial correction processing is finished.

(4) When an initial correction is made at the time when the power supply of the CPU 2b has been turned on a predetermined number of times from the point of time the power supply was turned on for the first time after the tire air pressure reduction detecting apparatus had been produced:

After it has been made sure in a DWS-ECU production line that the ECU is normal, $F_1=F_2=F_3=1$, $N_a=N_b=0$ and counter IGON=0 are written as the tire initial correction data in the $E^2$ PROM before completion of the tests.

Figure 8:
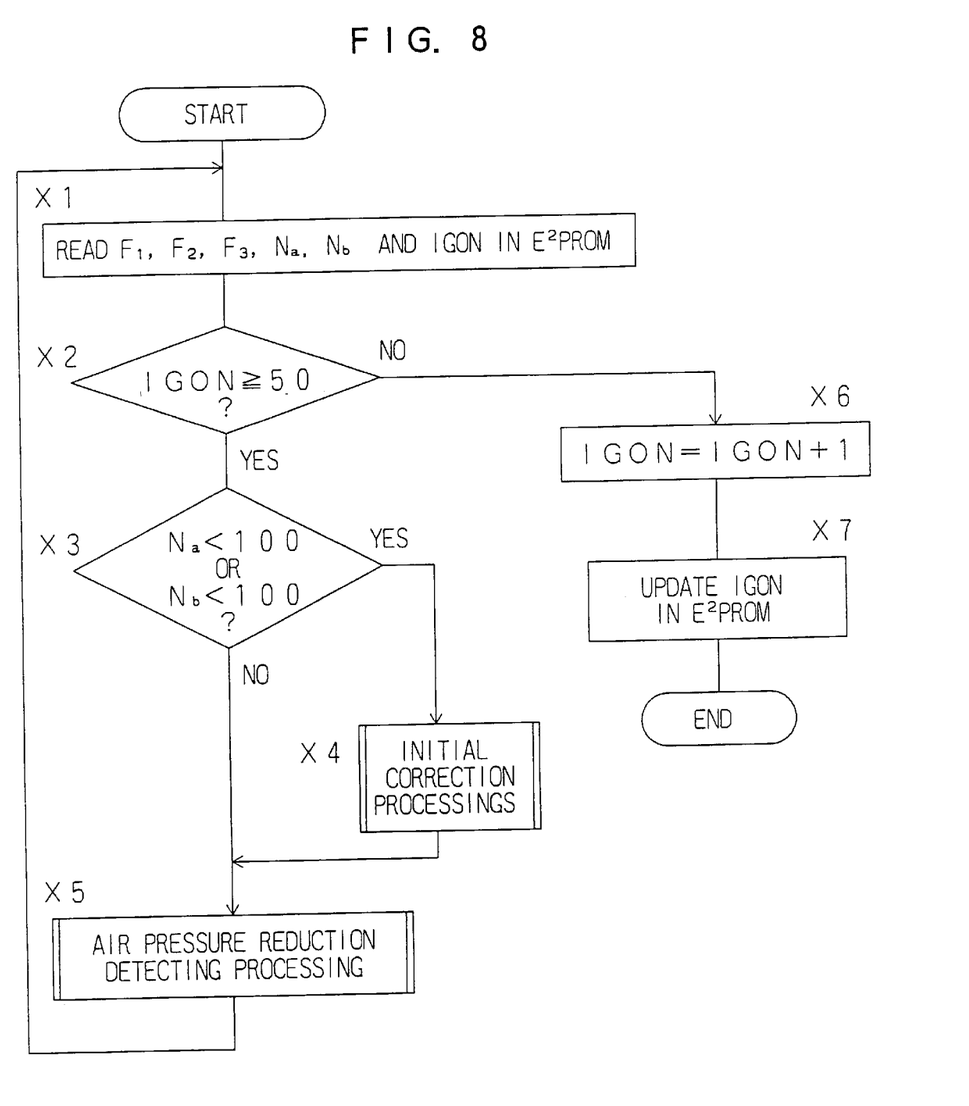
FIG. 8 is a flow chart illustrating the timing of an initial correction processing when the initial correction is to be made when the power supply has been turned on a predetermined number of times from the point of time the power supply was turned on for the first time after the tire air pressure reduction detecting apparatus had been produced.

Then, as shown in the flow chart in FIG. 8, the data are read after the power supply of CPU 2b has been turned on for the first time (step X1). The number of power-turning-on times is counted by counting the IGON (step X6 to X7). When the IGON reaches a predetermined value (for example, 50), a tire initial correction processing starts (step X2 to step X5). Provision may be made such that 50 is set as the initial value of IGON and that a subtraction is made until the initial value becomes zero. No air pressure reduction judgment processing is made before the initial correction processing is finished.

In each of the embodiments above-mentioned, no initialization switch is discussed and illustrated in the drawings. This is because such an initialization switch is not necessary for embodying the present invention. However, an initialization processing may be executed through a manual operation when a tire is replaced or the like. In this connection, such an initialization switch is disposed.

The present invention is not limited to the embodiments discussed in the foregoing. For the safety of a motor vehicle, an ABS (Antilock Braking System) is being used more frequently. In consideration of the fact that such an ABS has wheel rotational velocity sensors for respectively detecting the rotational states of the four tires, provision may be made such that a tire air pressure reduction detecting apparatus is incorporated in an ABS and that a tire air pressure reduction judgment processing and an initial correction processing are executed with the use of a microcomputer for the ABS.

A variety of modifications in designing may be made without departing from the spirit of the invention.

What is claimed is:

1. A tire air pressure reduction detecting apparatus that detects the angular velocities of the tires of a motor vehicle having four wheels, and that detects a reduction in tire air pressure based on the angular velocities thus detected, and being adapted to execute an initial correction processing based on the dynamic load radii of the tires, comprising:

an initial correcting apparatus which performs initial correction processing that automatically starts at a time when a power supply of a computer for executing a tire air pressure reduction detection processing is turned on for the first time after the tire air pressure reduction detecting apparatus has been produced.

2. The tire air pressure reduction detecting apparatus recited in claim 1, wherein the initial correction processing automatically starts in the absence of an actuation of an initialization switch.

3. A tire air pressure reduction detecting apparatus that detects the angular velocities of the tires of a motor vehicle having four wheels, and that detects a reduction in tire air pressure based on the angular velocities thus detected, and being adapted to execute an initial correction processing based on the dynamic load radii of the tires, comprising:

an initial correcting apparatus which performs initial correction processing that automatically starts at a time when the motor vehicle has traveled a predetermined distance after a point in time in which a power supply of a computer for executing a tire air pressure reduction detection processing was turned on for the first time after the tire air pressure reduction detecting apparatus has been produced.

4. The tire air pressure reduction detecting apparatus recited in claim 3, wherein the predetermined distance is greater than zero.

5. The tire air pressure reduction detecting apparatus recited in claim 4, wherein the initial correction processing automatically starts in the absence of an actuation of an initialization switch.

6. A tire air pressure reduction detecting apparatus that detects the angular velocities of the tires of a motor vehicle having four wheels, and that detects a reduction in tire air pressure based on the angular velocities thus detected, and being adapted to execute an initial correction processing based on the dynamic load radii of the tires, comprising:

an initial correcting apparatus which performs initial correction processing that automatically starts at a time when a predetermined period of time has passed after a point in time in which a power supply of a computer for executing a tire air pressure reduction detection processing was turned on for the first time after the tire air pressure reduction detecting apparatus had been produced.

7. The tire air pressure reduction detecting apparatus recited in claim 6, wherein the predetermined period of time is greater than zero.

8. The tire air pressure reduction detecting apparatus recited in claim 7, wherein the initial correction processing automatically starts in the absence of an actuation of an initialization switch.

9. A tire air pressure reduction detecting apparatus that detects the angular velocities of the tires of a motor vehicle having four wheels, and that detects a reduction in tire air pressure based on the angular velocities thus detected, and being adapted to execute an initial correction processing based on the dynamic load radii of the tires, comprising:

an initial correcting apparatus which performs initial correction processing that automatically starts at a time when a power supply of a computer for executing a tire air pressure reduction detection processing has been turned on a predetermined number of times from a point in time in which the power supply was turned on for the first time after the tire air pressure reduction detecting apparatus had been produced.

10. The tire air pressure reduction detecting apparatus recited in claim 9, wherein the predetermined number of time is greater than zero.

11. The tire air pressure reduction detecting apparatus recited in claim 10, wherein the initial correction processing automatically starts in the absence of an actuation of an initialization switch.

* * * * *